US008842168B2

(12) United States Patent
Berestov et al.

(10) Patent No.: US 8,842,168 B2
(45) Date of Patent: Sep. 23, 2014

(54) MULTI-VIEW VIDEO AND STILL 3D CAPTURE SYSTEM

(75) Inventors: Alexander Berestov, San Jose, CA (US); Jeongnam Youn, Sungnam-Si (KR)

(73) Assignee: Sony Corporation, Tokyo (JP)

( * ) Notice: Subject to any disclaimer, the term of this patent is extended or adjusted under 35 U.S.C. 154(b) by 480 days.

(21) Appl. No.: 12/916,146

(22) Filed: Oct. 29, 2010

(65) Prior Publication Data

US 2012/0105593 A1    May 3, 2012

(51) Int. Cl.
*H04N 13/02* (2006.01)
*G03B 35/10* (2006.01)
*G02B 27/14* (2006.01)
*G02B 27/22* (2006.01)
*G03B 25/02* (2006.01)
*G02B 27/10* (2006.01)

(52) U.S. Cl.
CPC ........ *H04N 13/0217* (2013.01); *H04N 13/0207* (2013.01); *G03B 35/10* (2013.01); *G02B 27/143* (2013.01); *G02B 27/2214* (2013.01); *G03B 25/02* (2013.01); *G02B 27/1066* (2013.01)
USPC .................... 348/49; 348/42; 348/46; 348/50

(58) Field of Classification Search
CPC ............ H04N 13/239; H04N 13/0242; H04N 13/0241; H04N 13/0207; H04N 13/02251; H04N 13/0217
See application file for complete search history.

(56) References Cited

U.S. PATENT DOCUMENTS

| 2,055,118 | A | * | 9/1936 | Carpenter | 352/65 |
| 2,829,195 | A | * | 4/1958 | Goldmark | 348/268 |
| 3,060,319 | A | * | 10/1962 | Greunke | 250/235 |
| 5,016,109 | A | * | 5/1991 | Gaylord | 348/218.1 |
| 5,210,557 | A | * | 5/1993 | Kameyama et al. | 396/335 |
| 5,606,363 | A | * | 2/1997 | Songer | 348/49 |
| 5,727,242 | A | * | 3/1998 | Lo et al. | 396/324 |
| 5,905,591 | A | * | 5/1999 | Duncan et al. | 359/399 |
| 6,972,744 | B1 | | 12/2005 | Allio | |
| 7,009,638 | B2 | * | 3/2006 | Gruber et al. | 348/218.1 |
| 7,059,729 | B2 | * | 6/2006 | Hoshino et al. | 353/94 |
| 7,339,614 | B2 | * | 3/2008 | Gruber et al. | 348/218.1 |
| 7,427,733 | B2 | * | 9/2008 | Hares et al. | 250/207 |
| 7,631,839 | B1 | * | 12/2009 | Duncan et al. | 244/158.1 |
| 8,345,941 | B2 | * | 1/2013 | Oda et al. | 382/128 |

(Continued)

OTHER PUBLICATIONS

Smolic et al., "Intermediate View Interpolation Based on Multiview Video Plus Depth for Advanced 3D Video Systems", IEEE, Jan. 1, 2008, pp. 2448-2451.

D. Shah et al., "Multi-view auto-stero display and image compression", p. 1-25.

*Primary Examiner* — Sath V Perungavoor
*Assistant Examiner* — Matthew J Anderson
(74) *Attorney, Agent, or Firm* — Haverstock & Owens LLP

(57) ABSTRACT

A camera or camcorder with a multi-view three dimensional (3D) attachment enables acquisition of 3D images and video which are then able to be displayed to a user without the need for specialized glasses. The multi-view 3D attachment captures at least 3 views of the same image from different angles simultaneously on a sensor.

25 Claims, 8 Drawing Sheets

(56) References Cited

U.S. PATENT DOCUMENTS

| | | | |
|---|---|---|---|
| 2007/0057211 A1* | 3/2007 | Bahlman et al. .............. 250/584 |
| 2008/0309756 A1 | 12/2008 | Verburgh et al. |
| 2009/0146915 A1 | 6/2009 | Marathe |
| 2009/0262181 A1 | 10/2009 | Rotem et al. |
| 2010/0013927 A1* | 1/2010 | Nixon ........................... 348/144 |
| 2010/0328420 A1* | 12/2010 | Roman ....................... 348/14.08 |
| 2011/0069189 A1* | 3/2011 | Venkataraman et al. .. 348/218.1 |
| 2011/0080487 A1* | 4/2011 | Venkataraman et al. .. 348/218.1 |

* cited by examiner

MULTI-VIEW VIDEO AND STILL 3D CAPTURE SYSTEM

FIELD OF THE INVENTION

The present invention relates to the field of three dimensional (3D) imaging. More specifically, the present invention relates to a personal electronic device for 3D acquisition and visualization.

BACKGROUND OF THE INVENTION

Three dimensional technology has been developing for over a century, yet has never been able to establish itself in the mainstream generally due to complexity and cost for the average user. The emergence of Liquid Crystal Display (LCD) and Plasma screens which are better suited to rendering 3D images than traditional Cathode Ray Tube (CRT) monitors and televisions in both consumer electronics and the computer world has spurred interest in the technology. 3D systems have progressed from being technical curiosities and are now becoming practical acquisition and display systems for entertainment, commercial and scientific applications. With the boost in interest, many hardware and software companies are collaborating on 3D products.

NTT DoCoMo unveiled the Sharp mova SH251iS handset which is the first to feature a color screen capable of rendering 3D images. A single digital camera allows its user to take two dimensional (2D) images and, then using an editing system, convert them into 3D. The 3D images are sent to other phones with the recipient able to see the 3D images if they own a similarly equipped handset. No special glasses are required to view the 3D images on the auto-stereoscopic system. There are a number of problems with this technology though. In order to see quality 3D images, the user has to be positioned directly in front of the phone and approximately one foot away from its screen. If the user then moves slightly he will lose focus of the image. Furthermore, since only one camera is utilized, it can only take a 2D image and then via the 3D editor, the image is artificially turned into a 3D image. Quality of the image is therefore an issue.

The display can be improved though by utilizing a number of images, each spaced apart by 65 mm. With a number of images, the viewer can move his head left or right and will still see a correct image. However, there are additional problems with this technique. The number of cameras required increases. For example, to have four views, four cameras are used. Also, since the sets of numbers are repeating, there will still be a position that results in a reverse 3D image, just fewer of them. The reverse image can be overcome by inserting a null or black field between the repeating sets. The black field will remove the reverse 3D issue, but then there are positions where the image is no longer 3D. Furthermore, the number of black fields required is inversely proportional to the number of cameras utilized such that the more cameras used, the fewer black fields required. Hence, the multi-image display has a number of issues that need to be overcome for the viewer to enjoy his 3D experience.

SUMMARY OF THE INVENTION

A camera or camcorder with a multi-view three dimensional (3D) attachment enables acquisition of 3D images and video which are then able to be displayed to a user without the need for specialized glasses. The multi-view 3D attachment captures at least 3 views of the same image from different angles simultaneously on a sensor.

In one aspect, a device for directing at least three views of an object from different angles to a sensor comprises a frame, a plurality of apertures contained within the frame each for simultaneously receiving a view from the object from a different angle, a plurality of lenses each for focusing the received view on the sensor and a plurality of guides each for directing each of the views received to the sensor. The device further comprises a second plurality of lenses each for enabling the views to be received at the sensor at the same time. The plurality of apertures are configured in parallel in a horizontal row. The plurality of apertures comprise 9 apertures. The plurality of guides comprise a plurality of mirrors. The plurality of mirrors further comprise a first set of mirrors and a central mirror block, wherein the first set of mirrors direct each of the views towards the central mirror block and the central mirror block directs each of the views to a specified location of the sensor. The plurality of guides direct each of the views to a specified location of the sensor. The device is configured to couple to a camera device. The sensor is contained within a camera device.

In another aspect, a system for capturing a three dimensional image comprises a plurality of apertures each for receiving a view of an object from a different angle, a plurality of lenses each for focusing the received view and a sensor for simultaneously acquiring each of the views of the object. The system further comprises a second plurality of lenses each for enabling the views to be received at the sensor at the same time. The plurality of apertures are configured in parallel in a horizontal row. The plurality of apertures comprise 9 apertures. The system further comprises a plurality of mirrors to direct each of the views to a specified location of the sensor. The plurality of mirrors further comprise a first set of mirrors and a central mirror block, wherein the first set of mirrors direct each of the views towards the central mirror block and the central mirror block directs each of the views to the specified location of the sensor. The plurality of apertures are contained in a frame which is configured to couple to a camera device. The sensor is contained within a camera device.

In another aspect, a method of capturing a three dimensional image comprises enabling light of an object to pass through a plurality of apertures, directing the light to a specific location on a sensor and capturing the light at the sensor. The method further comprises focusing the light using a plurality of lenses. A second plurality of lenses enables the views to be received at the sensor at the same time. The plurality of apertures are configured in parallel in a horizontal row. The plurality of apertures comprise 9 apertures. A plurality of mirrors are configured to direct the light to a specified location of the sensor. The plurality of mirrors further comprise a first set of mirrors and a central mirror block, wherein the first set of mirrors direct each of the views towards the central mirror block and the central mirror block directs each of the views to the specified location of the sensor. The method further comprises generating a three dimensional image from the captured light. The sensor is contained within a camera device.

In yet another aspect, a camera device comprises an input frame, a plurality of apertures contained within the frame each for simultaneously receiving a view from an object from a different angle, a plurality of lenses each for focusing the received view, a plurality of guides each for directing each of the views received, a sensor for receiving each of the views, a memory for storing an application, the application for processing the views received at the sensors and generating a three dimensional image from the views and a processing component coupled to the memory, the processing component for processing the application. The camera device further comprises a second plurality of lenses each for enabling the views to be received at the sensor at the same time. Processing the views received at the sensors comprises image alignment and distortion correction. The plurality of apertures are configured in parallel in a horizontal row. The plurality of apertures comprise 9 apertures. The plurality of guides comprise a first set of mirrors and a central mirror block, wherein the first set of mirrors direct each of the views towards the central mirror block and the central mirror block directs each of the views to a specified location of the sensor. The camera device further comprises a screen for displaying the three dimensional image.

DETAILED DESCRIPTION OF THE PREFERRED EMBODIMENT

Acquiring a three dimensional (3D) image is able to be performed in several different manners. One implementation includes acquiring a set of images from different angles at the same time. For example, a specialized camera or an attachment to a camera enables 9 views of an object or scene to be captured simultaneously. The 9 views are then able to be processed and displayed as a 3D rendering of the object.

Figure 1:
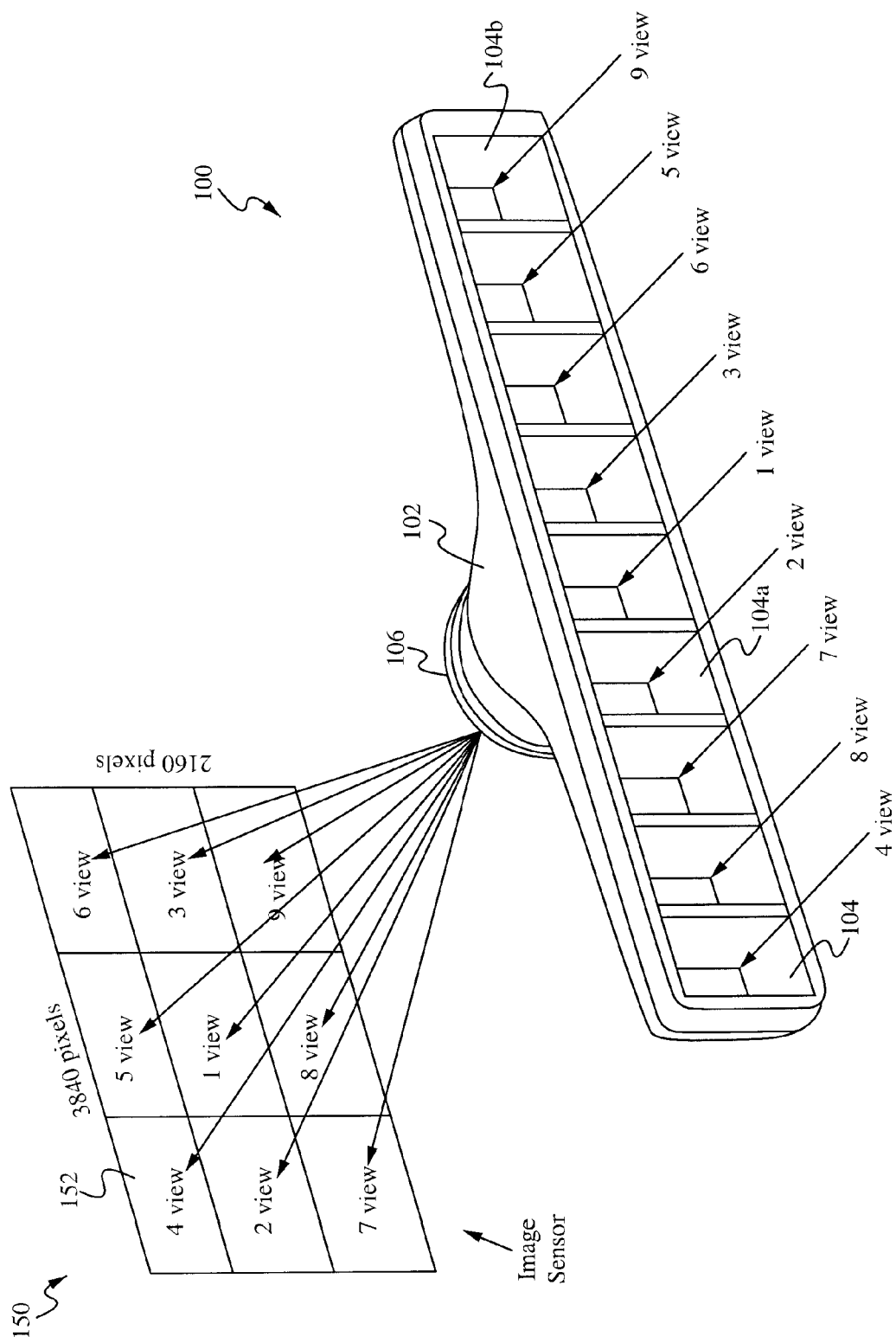
FIG. 1 illustrates a perspective view of a 9-view 3D attachment and sensor according to some embodiments.

FIG. 1 illustrates a perspective view of a 9-view 3D attachment and sensor according to some embodiments. The attachment 100 includes a frame 102 with a set of apertures 104 and a coupler 106. The frame 102 is configured to allow light of an object to pass through the apertures 104 to a sensor 150. The coupler 106 enables the attachment 100 to couple to a device such as a camera or camcorder. The frame 102 also includes one or more guides 108 (FIG. 2), such as mirrors, to direct the light/views to the sensor 150. The guides 108 are described further in the discussion of FIG. 2.

The frame 102 is able to be any shape, size or configuration to achieve the desired result of capturing several different views of an object at the same time. Further, the frame 102 is able to be constructed of any material such as plastic, metal, glass, a polymer or any combination thereof.

Each of the apertures 104 enables light from an object to be received at a distinct angle so that different views of the object are captured. For example, aperture 104a receives a different view of an object than aperture 104b. Moreover, all of the apertures 104 receive different views of the object since they are positioned so that there is a slightly different angle from the object to the apertures. There are many ways to enable the apertures 104 to receive light at distinct angles.

Included herein are several examples of configurations of the frame 102 and the apertures 104. In some embodiments, the frame 102 includes 9 rectangular apertures 104, equally spaced apart, with dividers between each aperture, where the apertures are configured in a horizontal row. In some embodiments, the frame 102 includes 9 rectangular apertures 104, configured in a 3×3 grid with dividers between each aperture. The apertures are able to be any shape such as rectangular, circular, square, diamond, very narrow rectangles such as slits, or any other shape. The number of apertures is able to be any number of apertures. In some embodiments, the number of apertures is significantly higher than two, so that the appropriate number of views is acquired to generate the 3D data that is viewable from any angle of a display displaying the 3D data. For example, in some embodiments, nine apertures are implemented. In some embodiments more than nine apertures are implemented. The spacing and separation of the apertures is able to be any configuration as well. For example, in some embodiments, there are no separators between each of the apertures, so essentially one aperture is used. The configuration of the apertures is able to be any configuration also. For example, the apertures are able to be positioned in a horizontal row, vertical column, grid, honeycomb structure, diagonal line, X-structure, ring structure or any other configuration. The examples described herein are not meant to be limiting in any way.

The sensor 150 is able to be any type of sensor such as a charge-coupled device (CCD) or complementary metal oxide semiconductor (CMOS). The sensor 150 captures the different views that come through the apertures 104. In some embodiments, the different views are directed to specific locations 152 on the sensor. For example, as shown in FIG. 1, the views are directed to sections 152 arranged in a 3×3 grid of the sensor 150.

The coupler 106 is configured to couple to an image/video acquisition device such as a camera or camcorder by fitting over the front of the device. The coupler 106 enables the attachment 100 to be coupled to or decoupled from the device. Any implementation for coupling to the device is able to be used. In some embodiments, the attachment 100 is permanently affixed to the device and is not removable.

Figure 2:
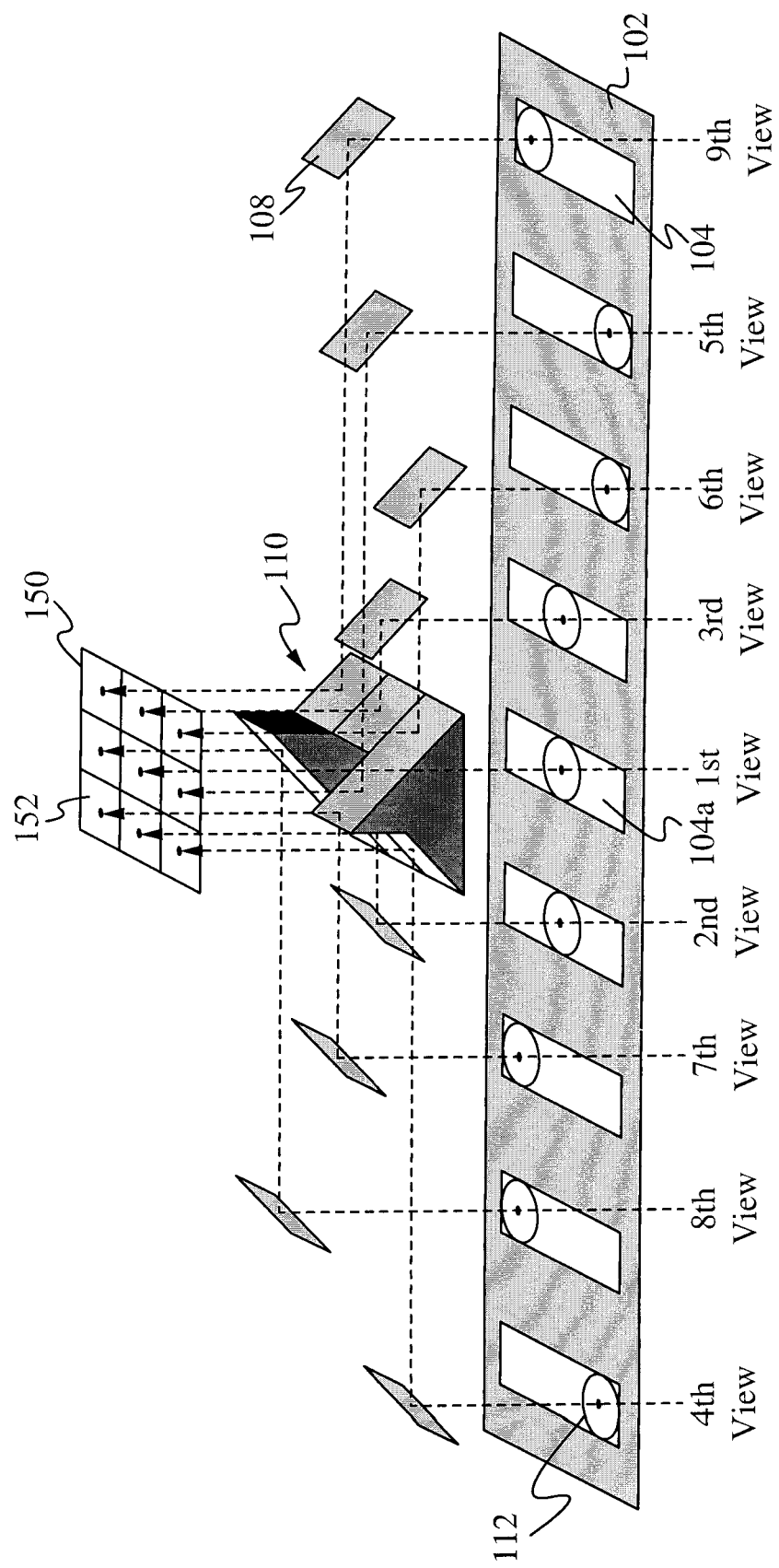
FIG. 2 illustrates an internal component view of the attachment and sensor according to some embodiments.

FIG. 2 illustrates an internal component view of the attachment and sensor according to some embodiments. The light of an object passes through each aperture 104 of the frame 102. The light comes from different angles from the object and presents different views of the object. In some embodiments, after the light passes through the apertures 104, the light passes through lenses 112 for focusing. In some embodiments, the lenses 112 each have a different focus. The light is then directed by one or more mirrors 108 to a specific location 152 on a sensor 150. In some embodiments, there is a mirror 108 for each of the apertures 104 for changing the direction a first time and a central mirror block 110 for changing direction a second time, where the central mirror block 110 directs the light to the specific location 152 on the sensor 150. In some embodiments, the central aperture 104a does not have a mirror behind it, and the central mirror block 110 has an opening to allow the light to pass directly through to the middle location of the sensor 150. In some embodiments, there are implementations to ensure the light passing through each aperture 104 is captured at the sensor 150 at the same time.

Figure 3:
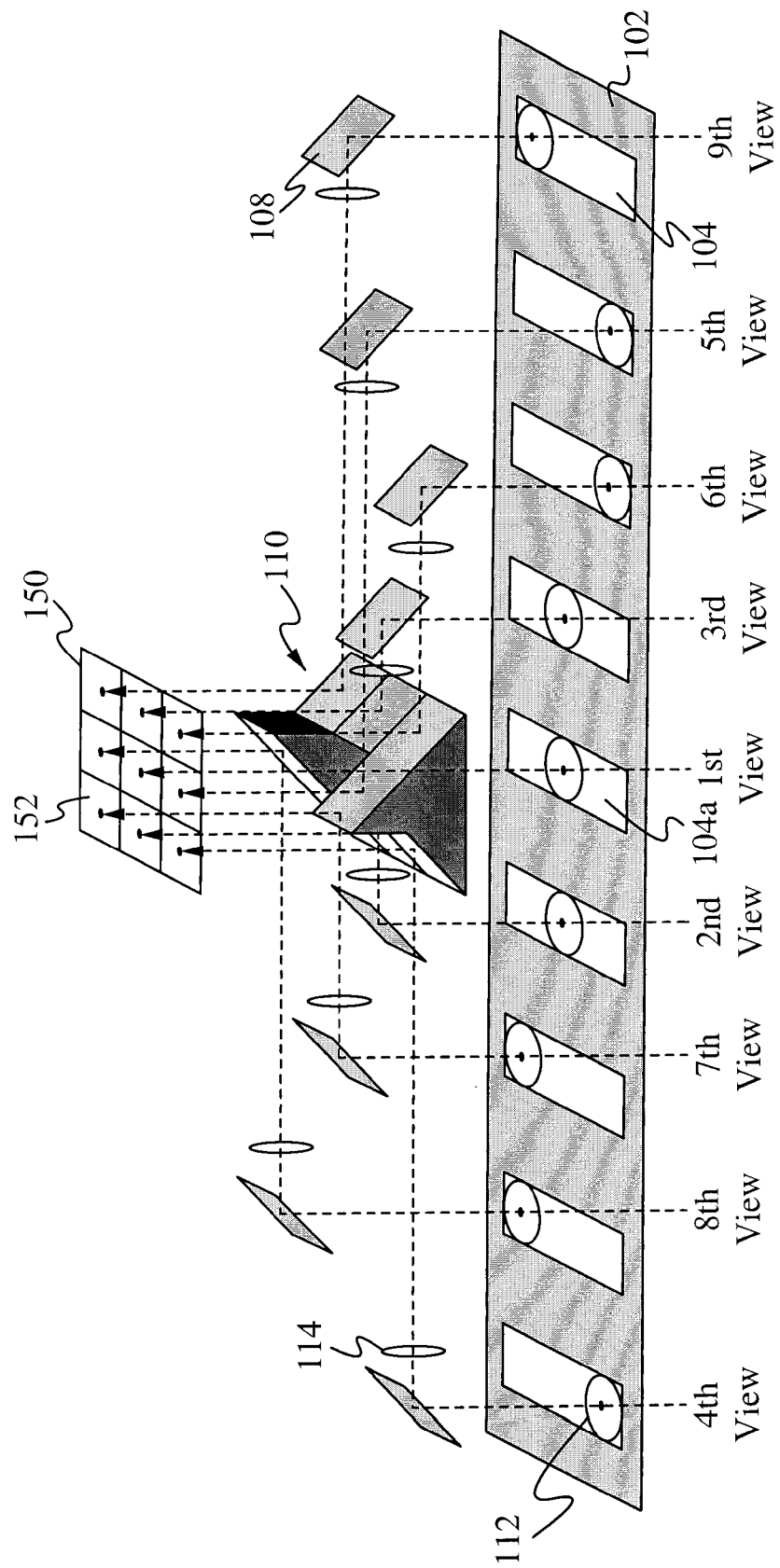
FIG. 3 illustrates an internal component view of the attachment and sensor according to some embodiments.

FIG. 3 illustrates an internal component view of the attachment and sensor according to some embodiments. The light of an object passes through each aperture 104 of the frame 102. The light comes from different angles from the object and presents different views of the object. In some embodiments, after the light passes through the apertures 104, the light passes through one or more lenses 112 for focusing. In some embodiments, the lenses 112 each have a different focus. The light is then directed by one or more mirrors 108 to a specific location 152 on a sensor 150. In some embodiments, there are one or more mirrors 108 for each of the apertures 104 for changing the direction a first time and a central mirror block 110 for changing direction a second time, where the central mirror block 110 directs the light to the specific location 152 on the sensor 150. In some embodiments, before the light reaches the central mirror block 110, the light passes through one or more additional lenses 114 or other item(s) to ensure the light passing through each aperture 104 is captured at the sensor 150 at the same time. In some embodiments, the central aperture 104a does not have a mirror behind it, and the central mirror block 110 has an opening to allow the light to pass directly through to the middle location of the sensor 150.

Figure 4:
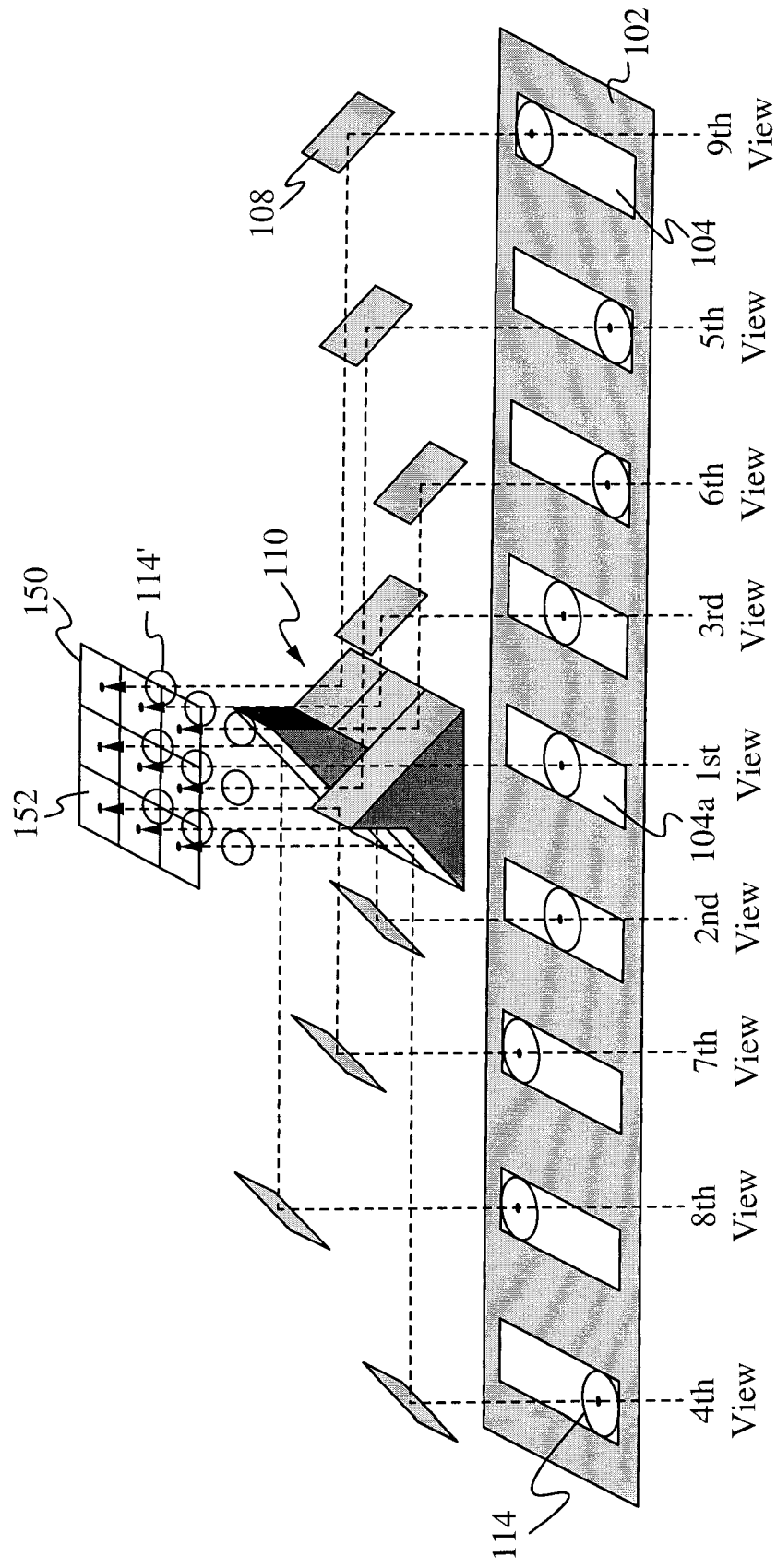
FIG. 4 illustrates an internal component view of the attachment and sensor according to some embodiments.

FIG. 4 illustrates an internal component view of the attachment and sensor according to some embodiments. The light of an object passes through each aperture 104 of the frame 102. The light comes from different angles from the object and presents different views of the object. In some embodiments, after the light passes through the apertures 104, the light passes through one or more lenses 112 for focusing. In some embodiments, the lenses 112 each have a different focus. The light is then directed by one or more mirrors 108 to a specific location 152 on a sensor 150. In some embodiments, there are one or more mirrors 108 for each of the apertures 104 for changing the direction a first time and a central mirror block 110 for changing the direction a second time, where the central mirror block 110 directs the light to the specific location 152 on the sensor 150. In some embodiments, after the light reaches the central mirror block 110 but before the sensor 150, the light passes through one or more additional lenses 114' or other item(s) to ensure the light passing through each aperture 104 is captured at the sensor 150 at the same time. In some embodiments, the central aperture 104a does not have a mirror behind it, and the central mirror block 110 has an opening to allow the light to pass directly through to the middle location of the sensor 150.

Figure 5:
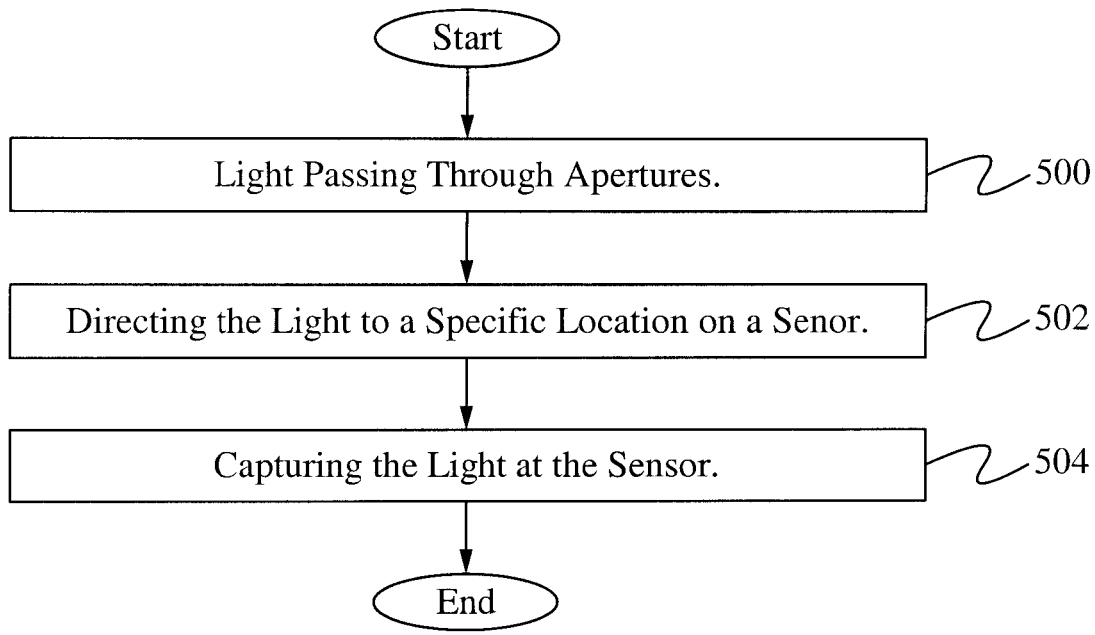
FIG. 5 illustrates a flowchart of a method of capturing 3D data according to some embodiments.

FIG. 5 illustrates a flowchart of a method of capturing 3D data according to some embodiments. In the step 500, light of an object passes through each aperture of a device. In the step 502, the light is directed to a sensor. In the step 504, the light is captured on different sections of a sensor, thus separate images from different angles/views are captured simultaneously on the sensor. In some embodiments, steps of focusing and pressing a button to acquire the 3D data are also included. For example, a user aims a camera at an object, the camera focuses on the object, the user presses a button to take a picture which then involves the appropriate views being acquired at the sensor and then the camera generates a 3D image or video from the acquired views. Fewer or additional steps are able to be included. Further, the order of the steps is able to be changed where possible.

Figure 6:
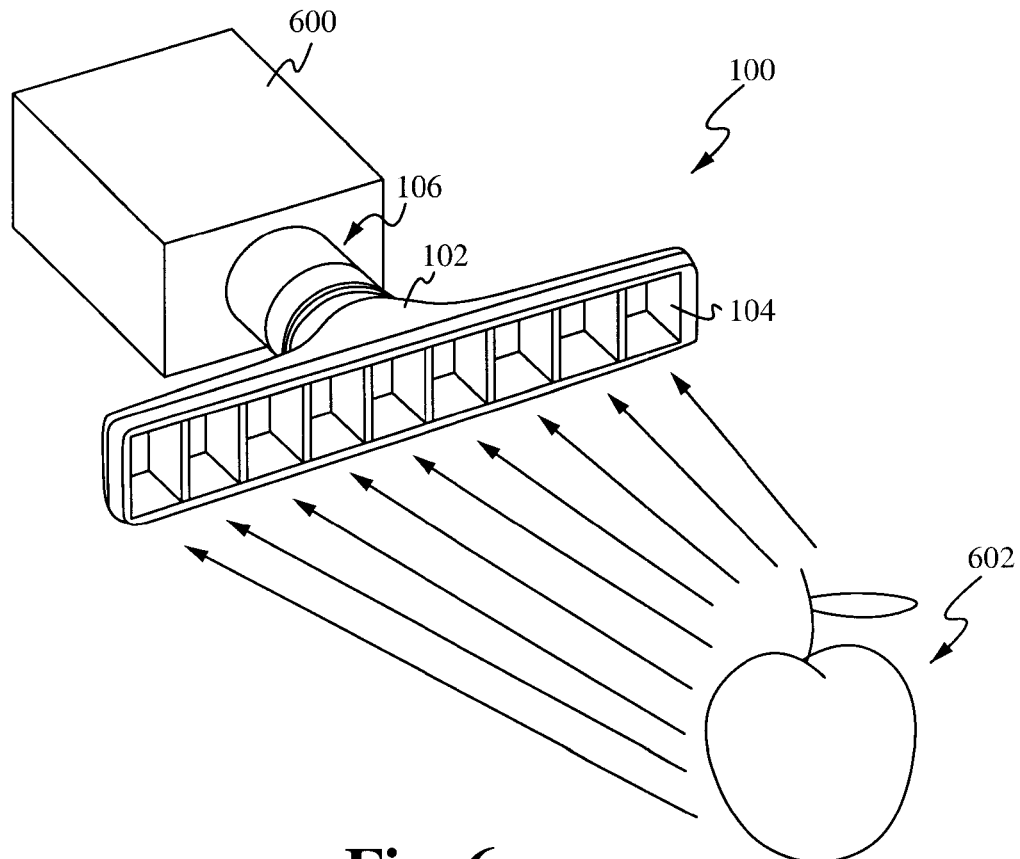
FIG. 6 illustrates a perspective view of a camera device with an attachment for capturing a 3D image of an object according to some embodiments.

FIG. 6 illustrates a perspective view of a camera device with an attachment for capturing a 3D image of an object according to some embodiments. An attachment 100 coupled to a camera device 600 is used to acquire images of the object 602 from different angles (e.g. different views). The light from the object passes through the apertures 104. The light is then directed to specific locations 152 (FIG. 1) of a sensor 150 (FIG. 1) using one or more mirrors 108 (FIG. 2). For example, the nine apertures 104 receive nine different views of the object 602, and each of the views is captured by the sensor 150 (FIG. 1) of the camera device 600.

Figure 7:
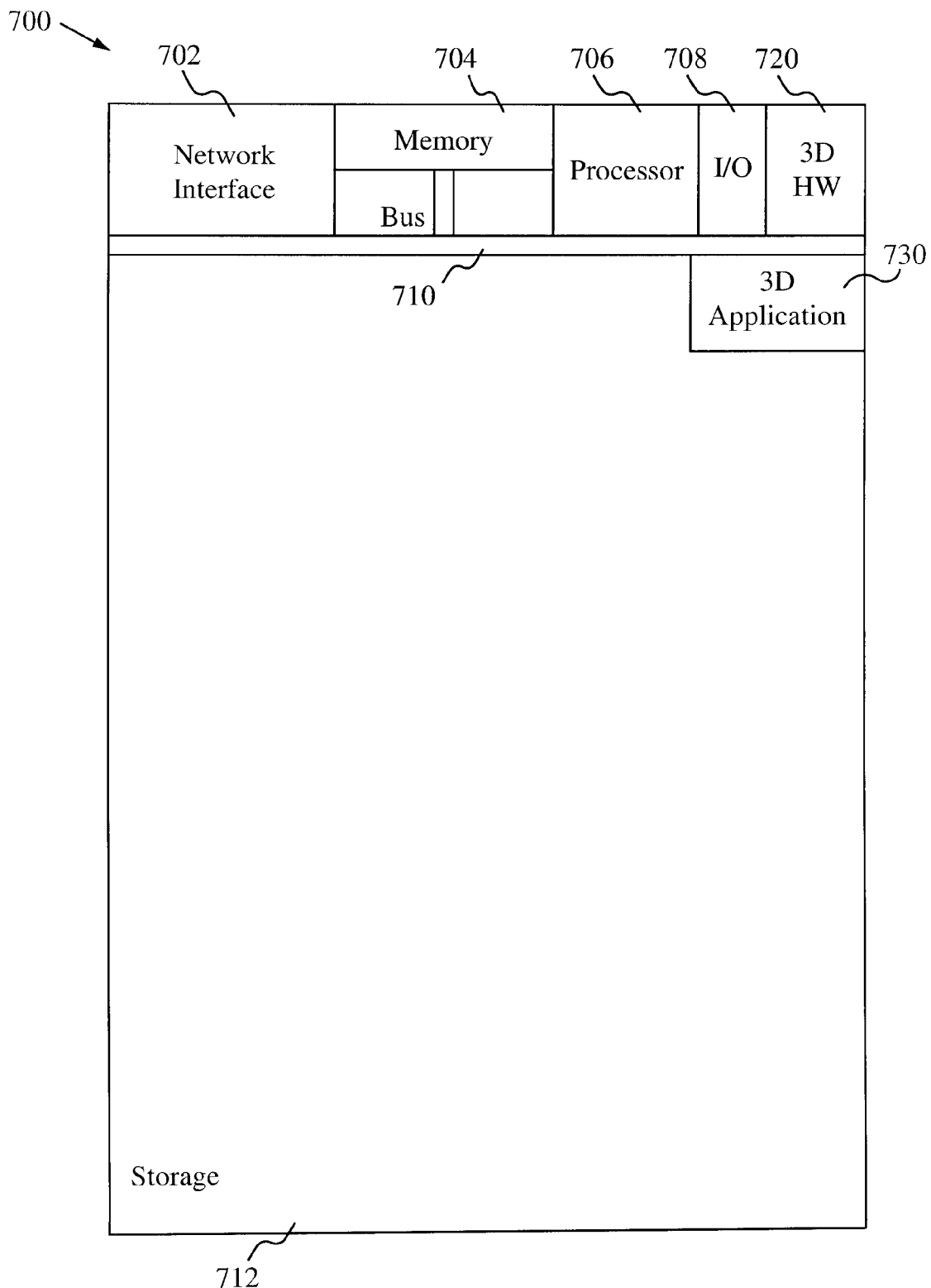
FIG. 7 illustrates a block diagram of an exemplary computing device configured to acquire 3D data according to some embodiments.

FIG. 7 illustrates a block diagram of an exemplary computing device 700 configured to acquire and/or present 3D data according to some embodiments. The computing device 700 is able to be used to acquire, store, compute, process, communicate and/or display information such as images and videos. For example, a computing device 700 is able to acquire and store a 3D image or video. In another example, the computing device 700 is able to display a 3D image or video. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, display, printer, modem, touchscreen, button interface and other devices. In some embodiments, the hardware structure includes multiple processors. 3D acquisition/display application(s) 730 used to perform the 3D acquisition/display are likely to be stored in the storage device 712 and memory 704 and processed as applications are typically processed. More or less components shown in FIG. 7 are able to be included in the computing device 700. In some embodiments, 3D acquisition/display hardware 720 is included. Although the computing device 700 in FIG. 7 includes applications 730 and hardware 720 for 3D acquisition/display, the 3D acquisition/display is able to be implemented on a computing device in hardware, firmware, software or any combination thereof. For example, in some embodiments, the 3D acquisition/display applications 730 are programmed in a memory and executed using a processor. In some embodiments, correctional signaling processing is implemented such as image alignment and distortion correction. In another example, in some embodiments, the 3D acquisition/display hardware 720 is programmed hardware logic.

In some embodiments, the 3D acquisition application(s) 730 include several applications and/or modules. Modules such as a processing module for processing the plurality of images, and a generating module for generating a 3D module from the plurality of images are described herein. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a camera, a camcorder, a digital camera, a digital camcorder, a camera phone, an iPod®/iPhone, a video player, a DVD writer/player, a Blu-ray® writer/player, a television, a home entertainment system or any other suitable computing device.

Figure 8:
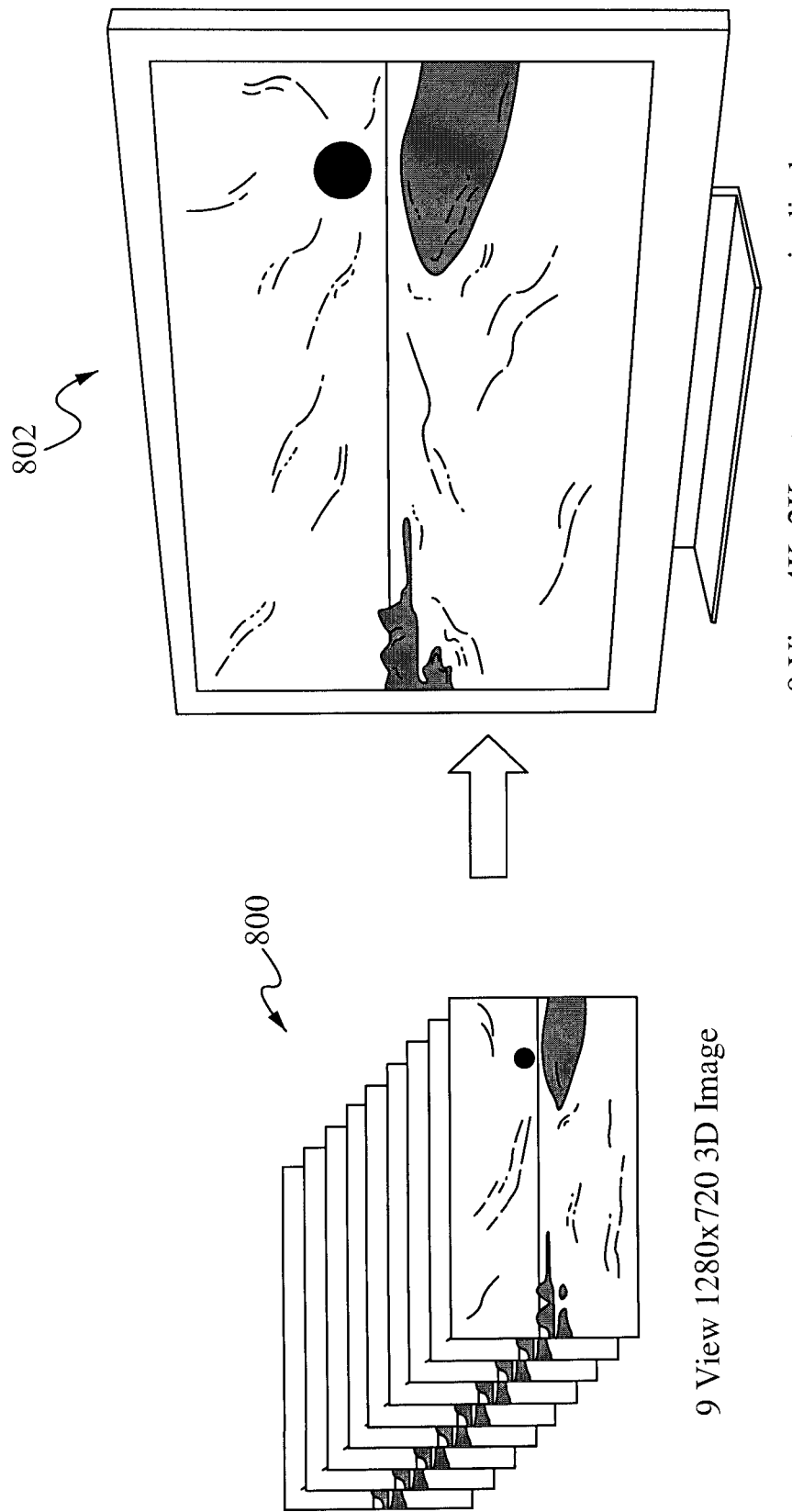
FIG. 8 illustrates an example of auto-stereoscopic 9-view HD playback according to some embodiments.

FIG. 8 illustrates an example of auto-stereoscopic 9-view HD playback according to some embodiments. Nine views 800 acquired by the methods described herein are able to be used to generate a 9-view auto-stereoscopic display 802 on a display such as a television. In some embodiments, the nine views 800 are nine 1280×720 images. Other size images are able to be used. In some embodiments, the 4K×2K 9-view auto-stereoscopic system displays 1280×720 resolution 3D. Other size displays are able to be used.

Figure 9:
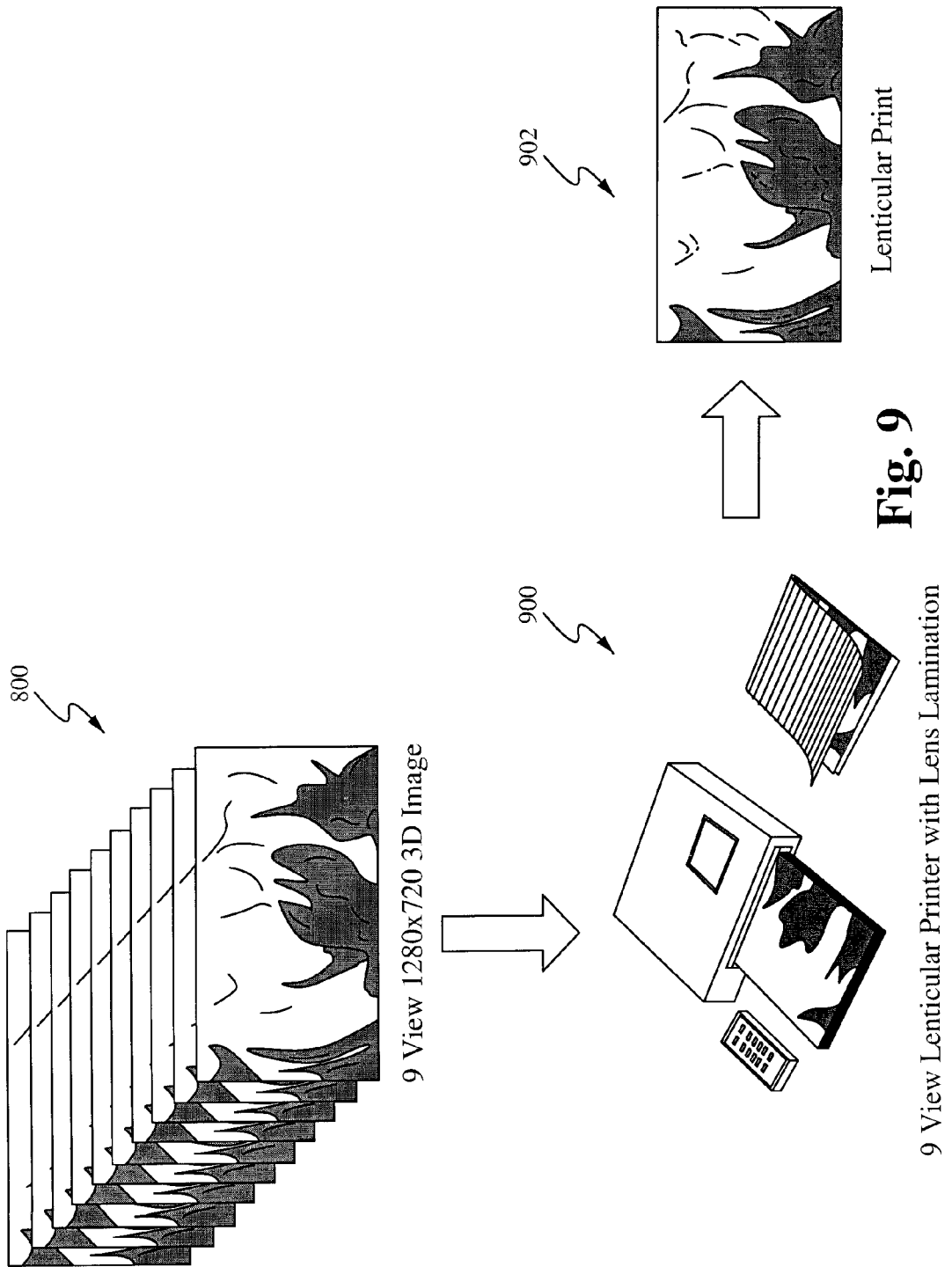
FIG. 9 illustrates an example of lenticular printing according to some embodiments.

FIG. 9 illustrates an example of lenticular printing according to some embodiments. Nine views 800 acquired by the methods described herein are able to be used to generate a lenticular print 902. In some embodiments, the nine views 800 are nine 1280×720 images. Other size images are able to be used. A 9-view lenticular printer 900 with lens lamination is able to use the nine views 800 to generate the lenticular print 902.

To utilize the 3D acquisition system, a user acquires a video/image such as on a digital camcorder. The video/image is acquired in 3D since multiple images are captured from different angles simultaneously. The 3D acquisition occurs automatically without additional user involvement beyond the standard image/video acquisition. The acquired images/video are able to then be used to generate a 3D image for display such as a 3D photograph or a 3D video.

In operation, 3D acquisition is used to acquire an image in 3D without requiring time and process consuming calculations. Furthermore, the 3D acquisition system described herein does not implement multiple cameras which would be cost ineffective. The 3D acquisition acquires multiple views, typically at least three views, of an object simultaneously, so that the image or video is able to be displayed in 3D when rendered. Furthermore, the 3D data is displayed in a manner so that a user does not need to wear specialized glasses to view the 3D data. Additionally, the user is not required to sit directly in front of the screen to view the 3D data. The acquired 3D video is able to be standard definition or high definition.

Some Embodiments of Multi-View Video and Still 3D Capture System

1. A device for directing at least three views of an object from different angles to a sensor comprising:
   a. a frame;
   b. a plurality of apertures contained within the frame each for simultaneously receiving a view from the object from a different angle;
   c. a plurality of lenses each for focusing the received view on the sensor; and
   d. a plurality of guides each for directing each of the views received to the sensor.
2. The device of clause 1 further comprising a second plurality of lenses each for enabling the views to be received at the sensor at the same time.
3. The device of clause 1 wherein the plurality of apertures are configured in parallel in a horizontal row.
4. The device of clause 1 wherein the plurality of apertures comprise 9 apertures.
5. The device of clause 1 wherein the plurality of guides comprise a plurality of mirrors.
6. The device of clause 5 wherein the plurality of mirrors further comprise a first set of mirrors and a central mirror block, wherein the first set of mirrors direct each of the views towards the central mirror block and the central mirror block directs each of the views to a specified location of the sensor.
7. The device of clause 1 wherein the plurality of guides direct each of the views to a specified location of the sensor.
8. The device of clause 1 wherein the device is configured to couple to a camera device.
9. The device of clause 1 wherein the sensor is contained within a camera device.
10. A system for capturing a three dimensional image comprising:
    a. a plurality of apertures each for receiving a view of an object from a different angle;
    b. a plurality of lenses each for focusing the received view; and
    c. a sensor for simultaneously acquiring each of the views of the object.
11. The system of clause 10 further comprising a second plurality of lenses each for enabling the views to be received at the sensor at the same time.
12. The system of clause 10 wherein the plurality of apertures are configured in parallel in a horizontal row.
13. The system of clause 10 wherein the plurality of apertures comprise 9 apertures.
14. The system of clause 10 further comprising a plurality of mirrors to direct each of the views to a specified location of the sensor.
15. The system of clause 14 wherein the plurality of mirrors further comprise a first set of mirrors and a central mirror block, wherein the first set of mirrors direct each of the views towards the central mirror block and the central mirror block directs each of the views to the specified location of the sensor.
16. The system of clause 10 wherein the plurality of apertures are contained in a frame which is configured to couple to a camera device.
17. The system of clause 10 wherein the sensor is contained within a camera device.
18. A method of capturing a three dimensional image comprising:
    a. enabling light of an object to pass through a plurality of apertures;
    b. directing the light to a specific location on a sensor; and
    c. capturing the light at the sensor.
19. The method of clause 18 further comprising focusing the light using a plurality of lenses.
20. The method of clause 18 wherein a second plurality of lenses enables the views to be received at the sensor at the same time.
21. The method of clause 18 wherein the plurality of apertures are configured in parallel in a horizontal row.
22. The method of clause 18 wherein the plurality of apertures comprise 9 apertures.
23. The method of clause 18 wherein a plurality of mirrors are configured to direct the light to a specified location of the sensor.
24. The method of clause 23 wherein the plurality of mirrors further comprise a first set of mirrors and a central mirror block, wherein the first set of mirrors direct each of the views towards the central mirror block and the central mirror block directs each of the views to the specified location of the sensor.
25. The method of clause 18 further comprising generating a three dimensional image from the captured light.
26. The method of clause 18 wherein the sensor is contained within a camera device.
27. A camera device comprising:
    a. an input frame;
    b. a plurality of apertures contained within the frame each for simultaneously receiving a view from an object from a different angle;
    c. a plurality of lenses each for focusing the received view;
    d. a plurality of guides each for directing each of the views received;
    e. a sensor for receiving each of the views;
    f. a memory for storing an application, the application for:

i. processing the views received at the sensors; and
ii. generating a three dimensional image from the views; and
g. a processing component coupled to the memory, the processing component for processing the application.
28. The camera device of clause 27 further comprising a second plurality of lenses each for enabling the views to be received at the sensor at the same time.
29. The camera device of clause 27 wherein processing the views received at the sensors comprises image alignment and distortion correction.
30. The camera device of clause 27 wherein the plurality of apertures are configured in parallel in a horizontal row.
31. The camera device of clause 27 wherein the plurality of apertures comprise 9 apertures.
32. The camera device of clause 27 wherein the plurality of guides comprise a first set of mirrors and a central mirror block, wherein the first set of mirrors direct each of the views towards the central mirror block and the central mirror block directs each of the views to a specified location of the sensor.
33. The camera device of clause 27 further comprising a screen for displaying the three dimensional image.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A device for directing at least three views of an object from different angles to a sensor comprising:
   a. a frame;
   b. a plurality of apertures contained within the frame each for simultaneously receiving a view from the object from a different angle, wherein the plurality of apertures are equally spaced apart;
   c. a plurality of lenses each for focusing the received view on the sensor, wherein each lens of the plurality of lenses has a different focus; and
   d. a plurality of guides each for directing each of the views received to the sensor, wherein the plurality of guides comprise a plurality of mirrors, wherein the plurality of mirrors further comprise a first set of mirrors and a central mirror block, wherein the first set of mirrors direct each of the views towards the central mirror block and the central mirror block directs each of the views to a specified location of the sensor, further wherein the central mirror block includes a first set of mirror segments facing a first direction and a second set of three mirror segments facing a second direction, each set of mirror segments with at least one mirror segment larger than the other mirror segments.

2. The device of claim 1 further comprising a second plurality of lenses each for enabling the views to be received at the sensor at the same time.

3. The device of claim 1 wherein the plurality of apertures are configured in parallel in a horizontal row.

4. The device of claim 1 wherein the plurality of apertures comprise 9 apertures.

5. The device of claim 1 wherein the plurality of guides direct each of the views to a specified location of the sensor.

6. The device of claim 1 wherein the device is configured to couple to a camera device.

7. The device of claim 1 wherein the sensor is contained within a camera device.

8. A system for capturing a three dimensional image comprising:
   a. a plurality of apertures each for receiving a view of an object from a different angle, wherein the plurality of apertures are equally spaced apart;
   b. a plurality of lenses each for focusing the received view, wherein each lens of the plurality of lenses has a different focus;
   c. a sensor for simultaneously acquiring each of the views of the object; and
   d. a plurality of mirrors each for directing each of the views received to the sensor, wherein the plurality of mirrors further comprise a first set of mirrors and a central mirror block, wherein the first set of mirrors direct each of the views towards the central mirror block and the central mirror block directs each of the views to a specified location of the sensor, further wherein the central mirror block includes a first set of mirror segments facing a first direction and a second set of three mirror segments facing a second direction, each set of mirror segments with at least one mirror segment larger than the other mirror segments.

9. The system of claim 8 further comprising a second plurality of lenses each for enabling the views to be received at the sensor at the same time.

10. The system of claim 8 wherein the plurality of apertures are configured in parallel in a horizontal row.

11. The system of claim 8 wherein the plurality of apertures comprise 9 apertures.

12. The system of claim 8 wherein the plurality of apertures are contained in a frame which is configured to couple to a camera device.

13. The system of claim 8 wherein the sensor is contained within a camera device.

14. A method of capturing a three dimensional image comprising:
   a. enabling light of an object to pass through a plurality of apertures, wherein the plurality of apertures are equally spaced apart;
   b. focusing the light using a plurality of lenses, wherein each lens of the plurality of lenses has a different focus;
   c. directing the light to a specific location on a sensor, wherein a plurality of mirrors comprise a first set of mirrors and a central mirror block, wherein the first set of mirrors direct each of the views towards the central mirror block and the central mirror block directs each of the views to a specified location of the sensor, further wherein the central mirror block includes a first set of mirror segments facing a first direction and a second set of three mirror segments facing a second direction, each set of mirror segments with at least one mirror segment larger than the other mirror segments; and
   d. capturing the light at the sensor.

15. The method of claim 14 wherein a second plurality of lenses enables the views to be received at the sensor at the same time.

16. The method of claim 14 wherein the plurality of apertures are configured in parallel in a horizontal row.

17. The method of claim 14 wherein the plurality of apertures comprise 9apertures.

18. The method of claim 14 further comprising generating a three dimensional image from the captured light.

19. The method of claim 14 wherein the sensor is contained within a camera device.

20. A camera device comprising:
   a. an input frame;
   b. a plurality of apertures contained within the frame each for simultaneously receiving a view from an object from a different angle, wherein the plurality of apertures are equally spaced apart, with a divider between each aperture, wherein the apertures are configured in a single, horizontal row;
   c. a plurality of lenses each for focusing the received view, wherein each lens of the plurality of lenses has a different focus;
   d. a plurality of guides each for directing each of the views received;
   e. a sensor for receiving each of the views, wherein the plurality of guides comprise a plurality of mirrors, wherein the plurality of mirrors further comprise a first set of mirrors and a central mirror block, wherein the first set of mirrors direct each of the views towards the central mirror block and the central mirror block directs each of the views to a specified location of the sensor, further wherein the central mirror block includes a first set of mirror segments facing a first direction and a second set of three mirror segments facing a second direction, each set of mirror segments with at least one mirror segment larger than the other mirror segments;
   f. a memory for storing an application, the application for:
      i. processing the views received at the sensor; and
      ii. generating a three dimensional image from the views; and
   g. a processing component coupled to the memory, the processing component for processing the application.

21. The camera device of claim 20 further comprising a second plurality of lenses each for enabling the views to be received at the sensor at the same time.

22. The camera device of claim 20 wherein processing the views received at the sensors comprises image alignment and distortion correction.

23. The camera device of claim 20 wherein the plurality of apertures are configured in parallel in a horizontal row.

24. The camera device of claim 20 wherein the plurality of apertures comprise 9 apertures.

25. The camera device of claim 20 further comprising a screen for displaying the three dimensional image.

* * * * *